(12) United States Patent
Mehta

(10) Patent No.: US 6,735,195 B1
(45) Date of Patent: May 11, 2004

(54) APPARATUS AND METHOD OF MINIMIZING DELAY OF TRANSMISSIONS OVER A NETWORK

(75) Inventor: Mehul Mehta, Potomac, MD (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/575,266

(22) Filed: May 22, 2000

Related U.S. Application Data

(60) Provisional application No. 60/173,583, filed on Dec. 29, 1999.

(51) Int. Cl.[7] ............................................... H04L 12/66
(52) U.S. Cl. ........................ 370/352; 370/477; 370/492
(58) Field of Search ................... 370/352, 356, 370/395.41, 492, 477, 493, 230.1; 710/6, 20, 25, 58; 709/102, 103

(56) References Cited

U.S. PATENT DOCUMENTS 5,883,891 A * 3/1999 Williams et al. ............. 370/356
6,570,849 B1 * 5/2003 Skemer et al. .............. 370/352

* cited by examiner

*Primary Examiner*—Chi Pham
*Assistant Examiner*—Anh-Vu H Ly
(74) *Attorney, Agent, or Firm*—Steubing McGuinness & Manaras LLP

(57) ABSTRACT

An apparatus and method of forwarding data from a sending node to a receiving node across a network first encapsulates non-time dependent data in specifically sized frames, and then transmits such encapsulated frames after frames with time dependent data are transmitted. More particularly, the data includes a set of time dependent data types and a set of non-time dependent data types. Each of the time dependent data types are specified (e.g., by their specific protocol specifications) to forward data in frames having a predefined frame size.

47 Claims, 5 Drawing Sheets

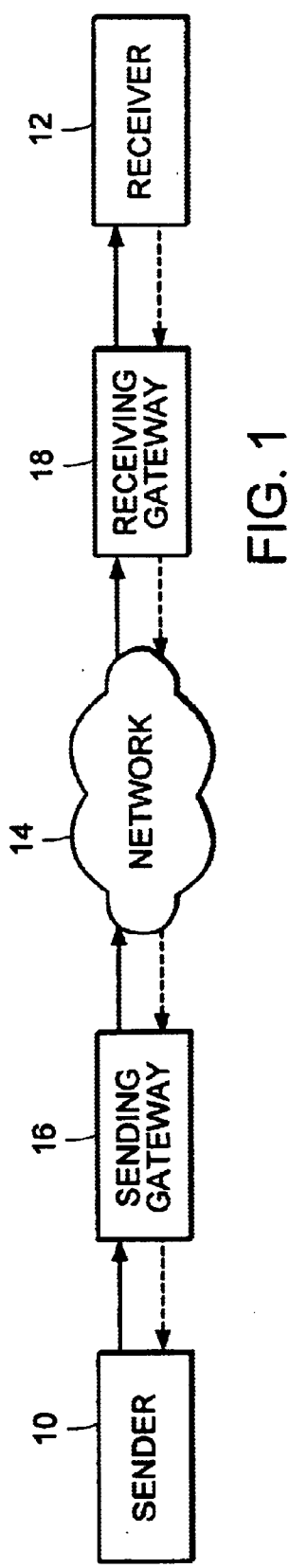
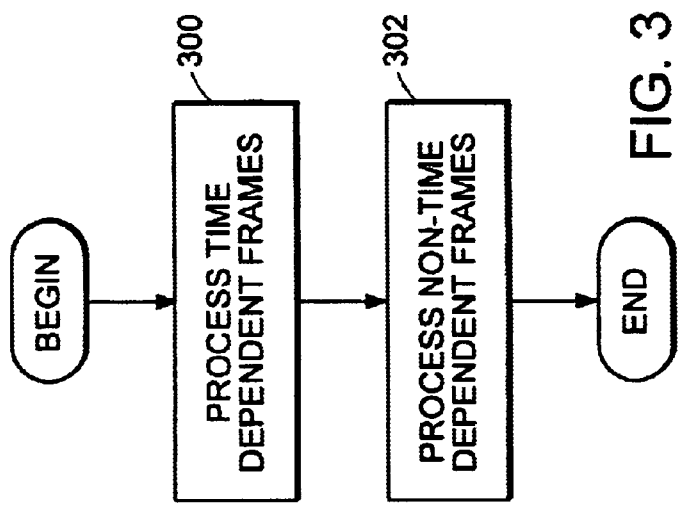

APPARATUS AND METHOD OF MINIMIZING DELAY OF TRANSMISSIONS OVER A NETWORK

PRIORITY

This U.S. patent application claims priority from U.S. provisional patent application serial No. 60/173,583, filed on Dec. 29, 1999, and entitled, "APPARATUS AND METHOD OF MINIMIZING DELAY OF AUDIO TRANSMISSIONS OVER A NETWORK," the disclosure of which is incorporated herein, in its entirety, by reference.

FIELD OF THE INVENTION

The invention generally relates to data, voice, and video transmission networks and, more particularly, the invention relates to minimizing the delay of time critical data transmissions across a network.

BACKGROUND OF THE INVENTION

Time dependent data, such as voice data, often is transmitted over large, packet based public networks (e.g., the Internet). Prior to transmission, a sending node may encode the voice data and encapsulate the encoded data in a data packet (e.g., an Internet Protocol packet). In a similar manner, upon receipt of a data packet having voice data, a receiver correspondingly may remove the encoded data from the packet, and then decode the removed data to produce the voice data.

Nodes transmitting voice data commonly have a processor (e.g., a gateway) that performs these noted encoding/decoding functions. In addition to processing voice data, many such currently available processors also process other types of data, such as fax data and modem data. Processing these various types of data on a single processor, however, undesirably can introduce delay to voice transmissions. For example, voice data can be held in a queue while fax data is being processed. Coupled with the inherent delay produced by transmission across the Internet (e.g., typically on the order of at least 150 milliseconds), this delay can degrade voice quality to unacceptably low levels.

SUMMARY OF THE INVENTION

In accordance with one aspect of the invention, an apparatus and method of forwarding data from a sending node to a receiving node across a network first encapsulates non-time dependent data in specifically sized frames, and then transmits such encapsulated frames after frames with time dependent data are transmitted. More particularly, the data includes a set of time dependent data types and a-set of non-time dependent data types. Each of the time dependent data types are specified (e.g., by their specific protocol specifications) to forward data in frames having a predefined frame size.

Accordingly, it is determined which data type of the set of time dependent data types has the largest predefined frame size (i.e., as specified by their respective protocol specifications). Data of each of the set of non-time dependent data types then are encapsulated in given frames. Each given frame has a size that is equal to that of the largest predefined frame size. In addition, each given frame has no more data than one of the set of non-time dependent data types. During each of a plurality of cycles, at least one frame of data for each of the set of data types having time dependent data is transmitted. Also during each of the plurality of cycles, one given frame is transmitted for each of the set of data types having the non-time dependent data. Each given frame is transmitted, during each cycle, after at least one frame of each of the set of time dependent data types is transmitted.

In some embodiments, the set of time dependent data types ranges from no data types to a plurality of data types. In a similar manner, the set of non-time dependent data types may range from no data types to a plurality of data types. The set of time dependent data types may include at least one of an audio data type (e.g., G.723.1 voice data type) and a video data type. The set of non-time dependent data types may include fax and modem data types. In illustrative embodiments, during each cycle, given frames having fax data are transmitted before transmission of given frames having modem data. In yet other embodiments, frames of time dependent data types are transmitted, during each cycle, in ascending order based upon the predefined size of frames of each such data type. Non-time dependent data types may be data types that are specified to tolerate a delay of greater than about 150 milliseconds.

In accordance with another aspect of the invention, a method and apparatus of transmitting data of a plurality of different data types from a sender to a receiver across a network first determines if the data includes at least one time dependent data type and at least one non-time dependent data type. If it is determined that the data includes at least one time dependent data type and at least one non-time dependent data type, then it is determined which of the at least one time dependent data types is specified to have the largest predefined frame size. The data of the at least one non-time dependent data types then is encapsulated in given frames having a size that is equal to the largest predefined size. Each given frame has data of no more than one data type. During each of a plurality of cycles, at least one frame of each data type is transmitted. At least one frame for each of the at least one time dependent data types preferably is transmitted before any of the given frames are transmitted.

Various embodiments of the invention are implemented as a computer program product having a computer usable medium with computer readable program code thereon. The computer readable code may be read and utilized by a computer system in accordance with conventional processes.

BRIEF DESCRIPTION OF THE FIGURES

FIG. 1 shows a generalized exemplary network arrangement that may be utilized with illustrative embodiments.

FIG. 3 shows a simplified process of transmitting data in a manner that reduces delay of time-dependent data across the network shown in FIGS. 1 and 2.

DESCRIPTION OF ILLUSTRATIVE EMBODIMENTS

Figure 2:
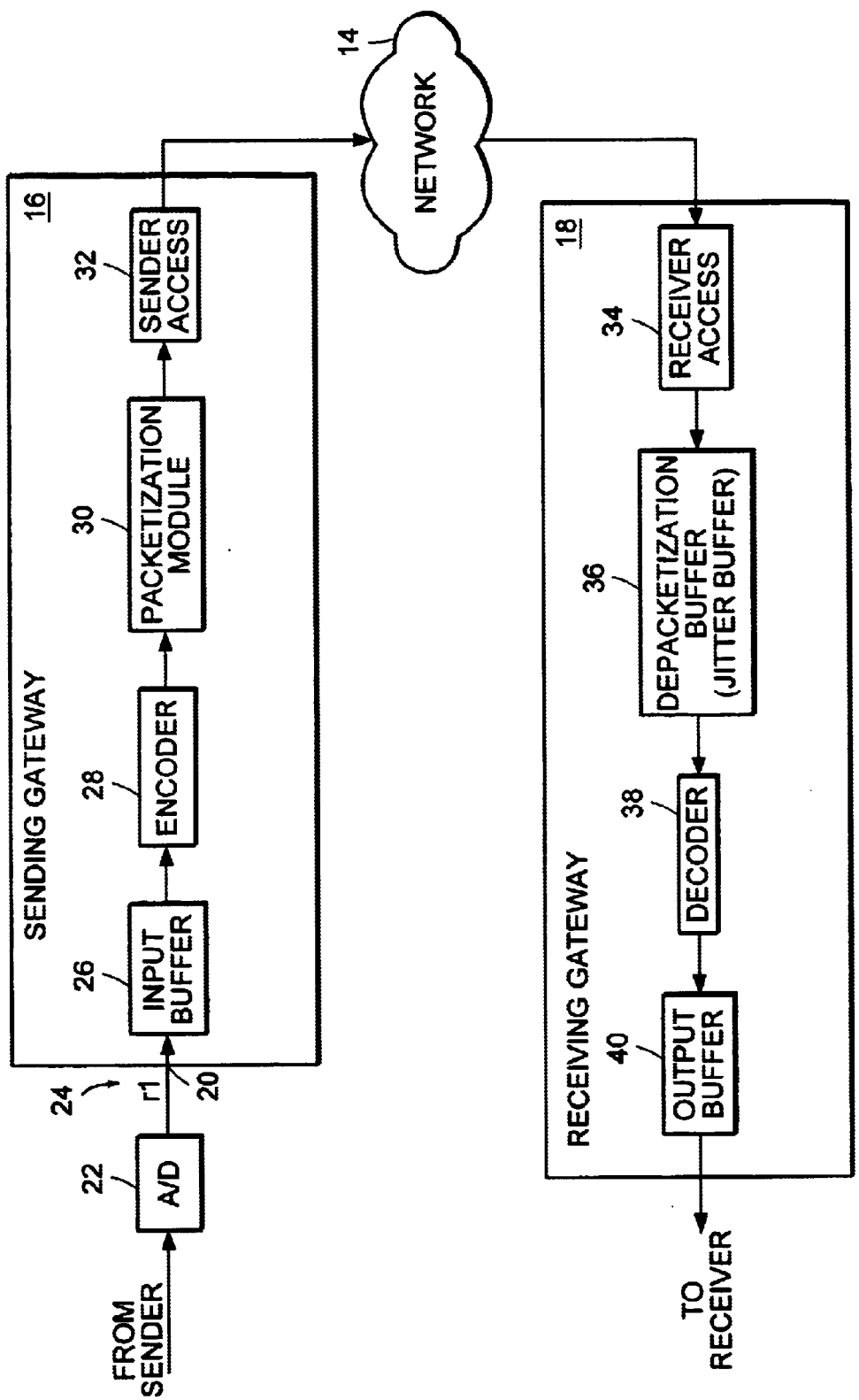
FIG. 2 schematically shows a more detailed view of the sending gateway and receiving gateway shown in FIG. 1.

In illustrative embodiments of the invention, a sending device transmits voice data to a receiving device across a network in a manner that minimizes delay and thus, improves the quality of the voice data received by the receiving device. FIG. 1 shows a generalized exemplary network arrangement that may be utilized with illustrative embodiments of the invention. The network arrangement includes a sender 10 that transmits voice data to a receiver 12 via a network 14. The sender 10 has an associated sending gateway 16 to facilitate transmission to the network 14, while the receiver 12 similarly has an associated receiving gateway 18 to facilitate receiving data from the network 14. The gateways 16 and 18 are discussed in greater detail below with reference to FIG. 2. The sender 10 and receiver 12 each may be any conventionally known device for transmitting and receiving voice data, such as a telephone or a computer device (e.g., a personal computer, router, switch, server, etc . . . ). In a similar manner, the network 14 may be any conventional network, such as a private enterprise IP (Internet Protocol) network, or a public network (e.g., the Internet).

In addition to having respective sending and receiving functionality, both the sender 10 and receiver 12 (and their respective accompanying gateway 16 or 18) also may have the respective receiving and sending functionality. This additional functionality is shown in FIG. 1 with dashed lines. Accordingly, although details of illustrative embodiments are discussed in terms of one way communication, those skilled in the art should understand that principles of illustrative embodiments can be applied to bidirectional communication. One-way communication therefore is discussed for exemplary purposes only.

FIG. 2 schematically shows a more detailed view of the sending gateway 16 and receiving gateway 18. Each gateway may be a part of a local network (e.g., a local area network) and thus, be coupled to a plurality of other network devices (not shown). Accordingly, the sending gateway 16 may act as an "on-ramp" to the network 14 for a plurality of other sending network devices, while the receiving gateway 18 may act as an "off-ramp" to a plurality of receiving network devices. As known in the art, a gateway is considered to be an "on-ramp" to the network 14 when it permits network devices to transmit data to the network 14. Conversely, a gateway is considered to be an "off-ramp" when it permits network devices to receive data from the network 14.

Each gateway preferably is comprised of one or more functional modules, and is capable of processing multiple channels of data. Each channel is capable of transmitting one of a plurality of specified data types between two network devices at any given time. For example, the sending gateway 16 and receiving gateway 18 may have three channels between three different pairs of senders and receivers. Each of the channels utilized by the sending gateway 16 may send data to a single receiving device (e.g., the receiving gateway 18), or to different receiving devices (e.g., different computer devices). For simplicity, each of the channels of the sending gateway 16 are discussed herein as if they are terminated by the receiving gateway 18 shown in the drawings. Of course, discussion of illustrative embodiments in these terms are not intended to limit the scope of the invention.

At any given time, each channel transmits one data type between the sender 10 and receiver 12. These data types may be the same as, or different than, the data types transmitted by the other channels. Among other types, such data types may be time dependent data types, and non-time dependent data types. Time dependent data types are those that require receipt of data with a minimal delay between the sender 10 and receiver 12. For example, voice (voice over IP) and video are considered time dependent data types since a relatively small delay (e.g., greater than about 150–200 milliseconds) can cause such a transmission to be unintelligible when received by the receiver 12. Non-time dependent data types, however, can withstand much greater delay without significantly affecting the quality of the received data. Among others, non-time dependent data types can include modem data and facsimile data. Various exemplary time dependent and non-time dependent protocols are discussed below with reference to illustrative embodiments. It should be noted, however, that although various protocols are discussed, illustrative embodiments are not intended to be limited to those protocols. Accordingly, although only voice, fax, and modem data types are discussed in some detail, various embodiments can be applied to other protocols (e.g., video).

As shown in FIG. 2, the sending gateway 16 includes an input 20 that receives message data from the sender 10 (FIG. 1) for transmission to the receiver 12 (FIG. 1). Prior to receipt by the input 20, the message data is converted from an analog signal to a digital signal by an analog to digital converter ("A/D converter 22"). The converted data then is transmitted to the input 20 by a digital line 24 (e.g., a T1 line) as a time division multiplexed signal comprised of a plurality of samples of the converted message data. In some embodiments, the A/D converter 22 is a part of a public switched telephone network (known as a "PSTN") between the sender 10 and the sending gateway 16, while in other embodiments, the A/D converter 22 is a part of the sending gateway 16. Of course, in those embodiments where the A/D converter 22 is a part of the sending gateway 16, a digital line is not necessary.

The input 20 of the sending gateway 16 is coupled with an input buffer 26 that buffers the incoming message data prior,to processing by the other functional modules in the sending gateway 16. The total number of samples of time dependent data (e.g., voice data) buffered in the input buffer 26 is specified by each specific time dependent data protocol that the sending gateway 16 is preconfigured to be capable of processing. This amount of buffered data is referred to in the art as a "frame" of data. In a similar manner, although generally not specified in the prior art to be processed in frames, illustrative embodiments also process non-time dependent data in frames (discussed below). Below in TABLE 1 is a list of exemplary voice protocols that may be utilized in illustrative embodiments, and their specified frame size:

TABLE 1

| PROTOCOL | FRAME SIZE |
| --- | --- |
| G.711 (PCM): | 125 microseconds |
| G.726 (32 K ADPCM) | 125 microseconds |
| G.728 (16 K LD-CELP) | 625 microseconds |
| G.729 (8 K CS-ACELP) | 10 milliseconds |
| G.729A (8 K CS-ACELP) | 10 milliseconds |
| G.723.1 (6.3 K MPMLQ) | 30 milliseconds |
| G.723.1 (5.3 K ACELP) | 30 milliseconds |
| GSM 6.10 (full rate) | 20 milliseconds |

An encoder 28 is coupled with the input buffer 26 to form each frame of data from the samples stored in the input buffer 26. Depending upon the protocol, the frames formed by the encoder 28 may include compressed or noncompressed samples. Of course, when frames are specified by a given protocol (e.g., as shown in the above list), the frame size will be the size as specified. When frames are not specified by a given protocol (e.g., a non-time dependent protocol, such as a fax or modem protocol), however, the encoder 28 sets the frame size to be the same size as the frame size specified by the time dependent protocol of the sending gateway 16 having largest frame size. More particularly, the sending gateway 16 is preconfigured to be capable of processing a plurality of given time dependent protocols. Accordingly, illustrative embodiments set the frame size of the non-time dependent protocols to be the same size as the one or more protocol(s) of the given time dependent protocols having the largest frame size. For example, if the sending gateway 16 is preconfigured to process the eight time dependent protocols listed above in TABLE 1, then the frame size of all non-time dependent protocols is set to be 30 milliseconds (i.e., the frame size of the G.723.1 (6.3K MPMLQ) and G.723.1 (5.3K ACELP) protocols since those protocols have the largest frame size). Details of the frame sizing process are discussed below with reference to FIGS. 3 and 4.

The time required to encode a frame of data is expected to be less than the total time size of the packet. For example, a frame of G.729A data (i.e., a 10 millisecond frame) is expected to be processed by the encoder 28 and other functional modules in about 1.48 milliseconds, while a frame of data of G.723 data (i.e., a 30 millisecond frame) is expected to be processed in about 7.23 milliseconds. Of course, the processing time depends upon a plurality of variables, such as processor speed, available internal memory, and the degree of assembly level optimization.

A packetization module 30 is coupled with the encoder 28 for adding the frames to a packet of data for transmission across a packet based network. In some embodiments, each packet includes one frame of data and a header with address information. In other embodiments, each packet may include more than one frame of data and a header with address information. The processing time required by the packetization module 30 is expected to be much less than the processing time required by the encoder 28. In some embodiments, the packetization module 30 is expected to process a frame in about one millisecond or less. Of course, the processing time of the packetization module 30 is dependent upon a plurality of variables, such as the processor speed, available internal memory, and assembly operation. Once the packet is formed, a sender access module 32 is utilized to output the data packets from the sending gateway 16 to the network 14.

The receiving gateway 18 includes a plurality of functional modules that have functions corresponding to those on the sending gateway 16. In particular, the receiving gateway 18 includes a receiver access module 34 that acts as an input for data received from the network 14. Data received from the receiver access module 34 is buffered in a depacketization buffer 36, which includes depacketization logic coupled with a jitter buffer. More particularly, the depacketization logic removes header information from each received packet to produce a frame, and then stores the produced frame in the jitter buffer.

As known by those skilled in the art, a jitter buffer compensates for known irregularities in data transmission in packet based networks by buffering a set amount of frames before permitting further processing by the receiving gateway 18. Such irregularities, which are referred to in the art as "jitter," include the arrival of packets in an order that is different than the order that they were transmitted, loss of packets, and variable delays of the arrival time of packets at the receiving gateway 18. Among other things, the size of the jitter buffer depends upon the type of network utilized to transmit the packets. For example, if a public network, such as the Internet, is utilized, then more jitter is expected and thus, a larger jitter buffer should be used. Alternatively, if a private enterprise IP network is utilized, a smaller jitter buffer can be used. Although a fixed jitter buffer generally will suffice, in some embodiments, the jitter buffer is a dynamic (adaptive) buffer that constantly monitors the arrival time of packets and consequently, adapts to changes in network condition.

A decoder 38 is coupled with the depacketization buffer 36 to remove frames from the jitter buffer, and decode them for output to the receiver 12. In particular, the decoder 38 decompresses the frame data (when necessary) and decodes the frame data to produce the samples. It is expected that the decoder 38 can decode/decompress frames in less time than required for the encoder 28 to encode/compress the frames at the sending gateway 16. For example, a frame of G.729A data (i.e., a 10 millisecond frame) is expected to be processed (i.e., decoded) by the decoder 38 in about 0.46 milliseconds, while a frame of data of G.723.1 data (i.e., a 30 millisecond frame) is expected to be processed in about 0.93 milliseconds. Of course, in a manner similar to other functional elements in the gateways 16 and 18, the processing time of the decoder 38 is dependent upon a plurality of variables, such as processor speed, available internal memory, and the degree of assembly level optimization.

The receiving gateway 18 also includes an output buffer 40 for storing data samples prior to transmission to the receiver 12. The samples may be transmitted directly to the receiver 12 if the receiver 12 is a digital device that utilizes digital input (e.g., a computer device), or may be converted from digital form to analog form by a digital to analog converter (not shown) if the receiver 12 is an analog device (e.g., a telephone connected to the PSTN).

Each of the functional modules discussed above in the receiving gateway 18 and the sending gateway 16 may be comprised of any known elements that implement their functions. In illustrative embodiments, each functional module is implemented by a conventionally configured digital signal processor. In other embodiments, a single digital signal processor implements a plurality of the noted functions. Moreover, it should be noted that each of the two discussed gateways 16 and 18 may have both the receiving logic and sending logic discussed and shown in FIG. 2.

Figure 4:
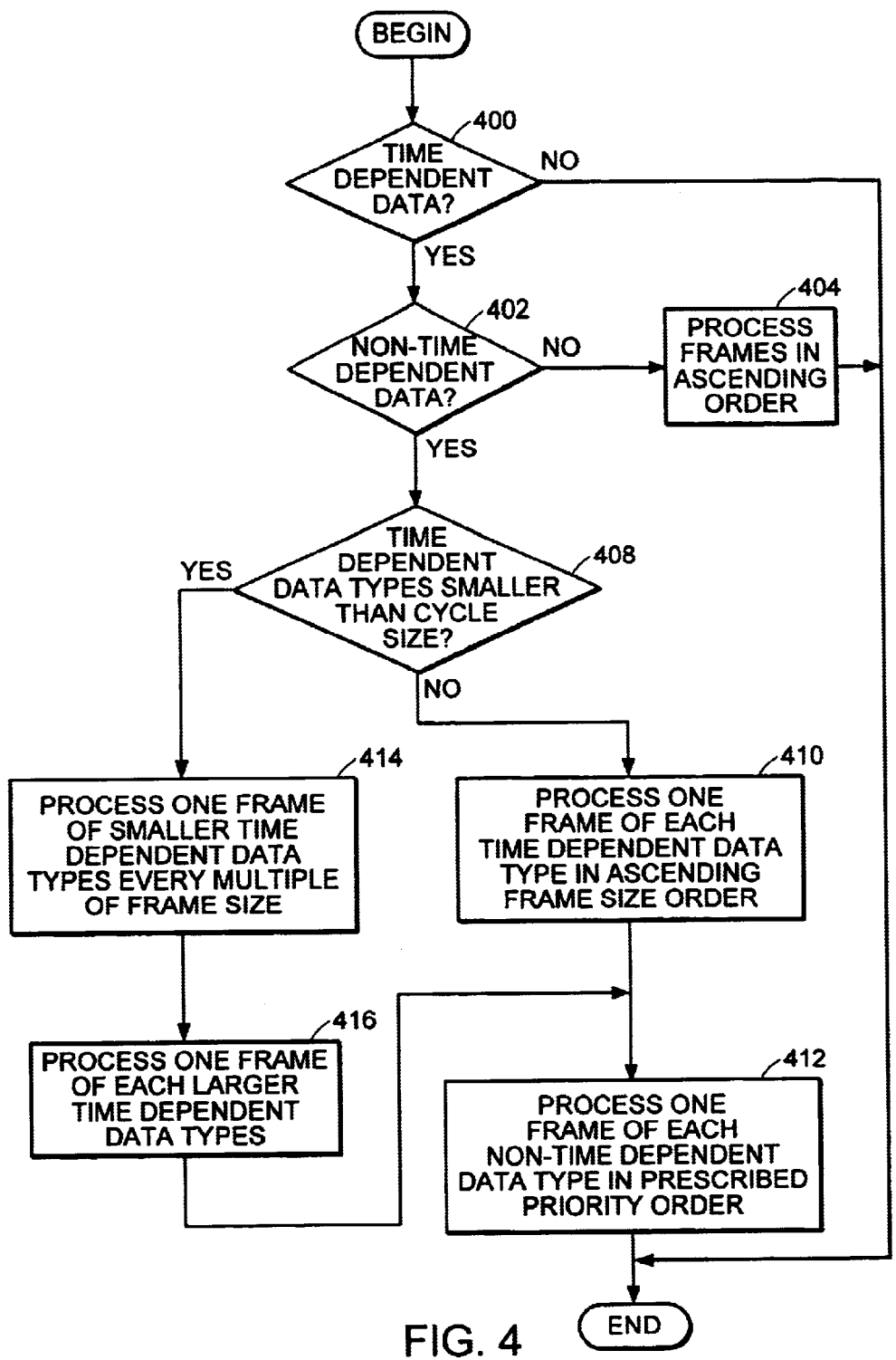
FIG. 4 shows an illustrative process executed by the sending gateway in FIGS. 1 and 2 during each transmission cycle of such gateway.

FIG. 3 shows a simplified process utilized by the sending gateway 16 for transmitting data across the network 14 shown in FIGS. 1 and 2. This process reduces transmission/processing delays that can be caused by the gateways 16 and 18, thus improving the quality of time dependent data received by the receiver 12. FIG. 4, discussed below, shows a more detailed data transmission process than that of the simplified process shown in FIG. 3. FIG. 3 is discussed first, followed by a discussion of FIG. 4. The process shown in FIG. 3 is assumed to be transmitting both time dependent data and non-time dependent data across a plurality of channels. Of course, each channel is an independent data transmission session between the sender 10 and the receiver 12 and thus, may include the same or different data types as those transmitted on other channels. This process is executed on a cyclical basis and thus, is repeated during each of a plurality of cycles, as necessary.

The process shown in FIG. 3 begins at step 300, in which time dependent frames are processed first during the cycle. This processing may include encoding and/or compression by the encoder 28, packetization of frames by the packetization module 30, and transmission across the network 14 by the sender access module 32. In accordance with illustrative embodiments, the time dependent frames generally are processed in a preconfigured order that processes smaller frames at least once before processing larger frames. Additional details of this preconfigured order are discussed below with reference to FIGS. 4 and 6.

After the time dependent frames are processed for their respective channels, the process continues to step 302, in which the non-time dependent data is processed in a prescribed priority order for their respective channels. As discussed below, this order preferably processes fax data before modem data. To that end, one frame of data for the channel transmitting the first type of non-time dependent data having the highest priority is encoded as a frame for further processing and ultimate transmission to the receiver 12. This is repeated until the data for the lowest priority non-time dependent data type is processed and transmitted, thus ending the process.

The frame size of all non-time dependent frames is set to be equal. To produce each non-time dependent frame, all of the protocols ("preconfigured protocols") that may be utilized by the sending gateway 16 for transmitting data first are ascertained. Next, a total number of samples equal to the set frame size ("set frame size") are retrieved from the input buffer 26 and processed by the encoder 28 and packetization module 30 for transmission on the network 14. Repeating the example noted above with regard to TABLE 1, if the sending gateway 16 is preconfigured to process the eight time dependent protocols in TABLE 1, then the frame size of all non-time dependent protocols is set to be 30 milliseconds (i.e., the frame size of the G.723.1 (6.3K MPMLQ) and G.723.1 (5.3K ACELP) protocols since those protocols have the largest frame size).

Accordingly, one frame of non-time dependent data is produced for each channel during each cycle. For example, if a first channel for fax data and a second channel for modem data are utilized, then one frame of fax data (i.e., in accord with the specified fax protocol) is first processed for the first channel, and then one frame of modem data (i.e., in accord with the specified modem protocol) is processed for the second channel. Additional frames of data may be processed, if necessary, in subsequent cycles.

FIG. 4 shows a more detailed data transmission process than that shown in the simplified process of FIG. 3. Specifically, FIG. 4 shows an illustrative transmission delay reducing process that is executed by the sending gateway 16 during each transmission cycle. This process is repeated during each cycle that data is transmitted from the sending gateway 16. It should be noted that in a manner similar to the process shown in FIG. 3, the order of the execution of various steps in the process of FIG. 4 may be changed.

The process begins at step 400, in which it is determined if any channels of the sending gateway 16 are to be utilized to transmit time dependent data. If no channels are to be utilized to transmit time dependent data, then the process ends. Conversely, if channels are to be utilized to transmit time dependent data, then it is determined at step 402 if any channels are to be utilized to transmit non-time dependent data. If it is determined at step 402 that no channels are to be utilized to transmit non-time dependent data, then only time dependent data is to be transmitted.

Figure 6:
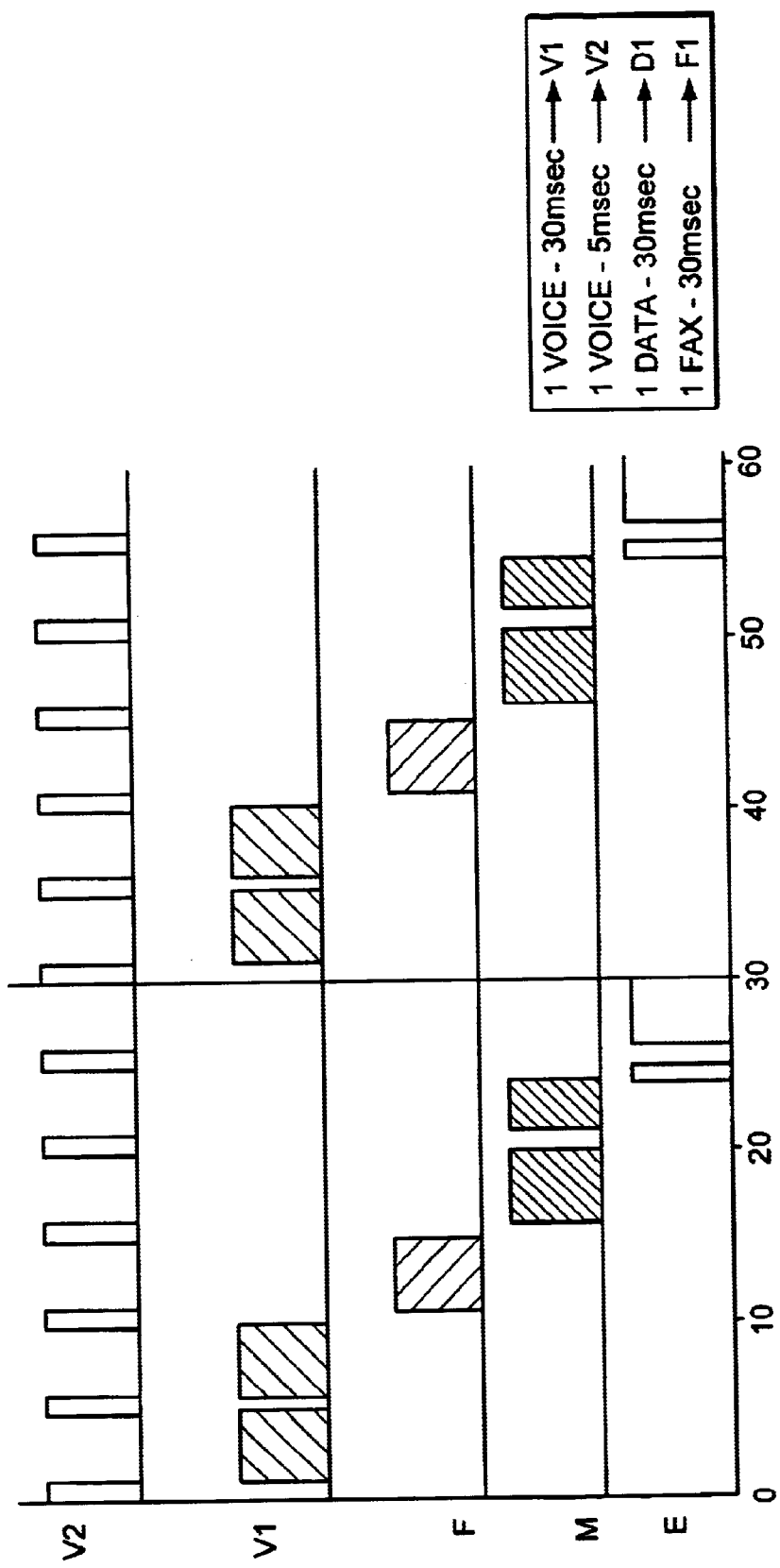
FIG. 6 graphically shows processing in a four channel gateway that processes voice data types having a smaller specified frame size than the length of the transmission cycle.

In such case, the process continues to step 404, in which frames of the time dependent data are processed in ascending order based upon frame size. Data processing may include, among other things, encoding, compressing, packetizing, and transmitting. To process frames in ascending order, the sending gateway 16 processes frames from the smallest in size to the largest in size. As shown in FIG. 6 (discussed in detail below), if any of the frames are smaller than the cycle size, then such frames are transmitted every multiple of frame size. For example, if the cycle is thirty milliseconds, and data having a five millisecond frame size and a thirty millisecond frame size are to be transmitted, then the five millisecond frames are processed every five milliseconds. Accordingly, during each cycle, six five millisecond frames are processed, while only one thirty millisecond frame is processed. The process ends once the frames are processed.

Returning to step 402, if it is determined that channels also are to be utilized to transmit non-time dependent data, then the process continues to step 408, in which it is determined if there are any time dependent data types that are smaller than the cycle size. If there are no such data types, then the process continues to step 410, in which one frame of each time dependent data type is processed, in its respective channel, in ascending order based upon the size of the frames. Stated another way, the gateway processes each frame with time dependent data from the smallest frame size to the largest frame size. After each of the time-dependent frames are processed, then the process continues to step 412, in which the gateway processes one frame of each non-time dependent data type in a prescribed priority order. In illustrative embodiments, the prescribed order of priority is as follows:

fax protocols are processed after all time dependent protocols (i.e., voice, video) are processed; and modem protocols are processed after all time dependent protocols and fax protocols are processed.

Accordingly, in the prescribed priority order, the encoder 28 retrieves one frame of data from the input buffer 26 for each channel transmitting non-time dependent data. Each frame is sized to be the same size as those frames of the time dependent preconfigured protocol specifying the largest frame size. (see step 302 of FIG. 3).

Returning to step 408, if there are time dependent data types to be processed that are smaller than the cycle size, then the process continues to step 414, in which the gateway processes one frame, in ascending order, of each such smaller sized frame at least once during every multiple of frame size. Examples of such data types are discussed above with reference to step 404, and with reference to FIG. 6. The process then continues to step 416, in which the gateway processes, in ascending frame size order, one frame of each time dependent data type having a frame size that is at least the size of the cycle. After executing step 416, the process continues with step 412 (discussed above).

Each of the steps in the processes shown in FIGS. 3 and 4 preferably is executed by the functional modules of the sending gateway 16. For example, although a specific step of packetizing is only indirectly mentioned in FIGS. 3 and 4, those skilled in the art should understand that transmission (i.e., one of the ways data is processed) requires that the packetization module 30 add header data to a frame. In addition, as suggested above when discussing FIG. 2, each of the steps discussed in FIGS. 3 and 4 has a corresponding receiving step that is executed by the receiving gateway 18. Accordingly, by way of example, the encapsulating and frame forming steps have corresponding processes executed by the receiving gateway 18 for removing samples from frames.

Figure 5:
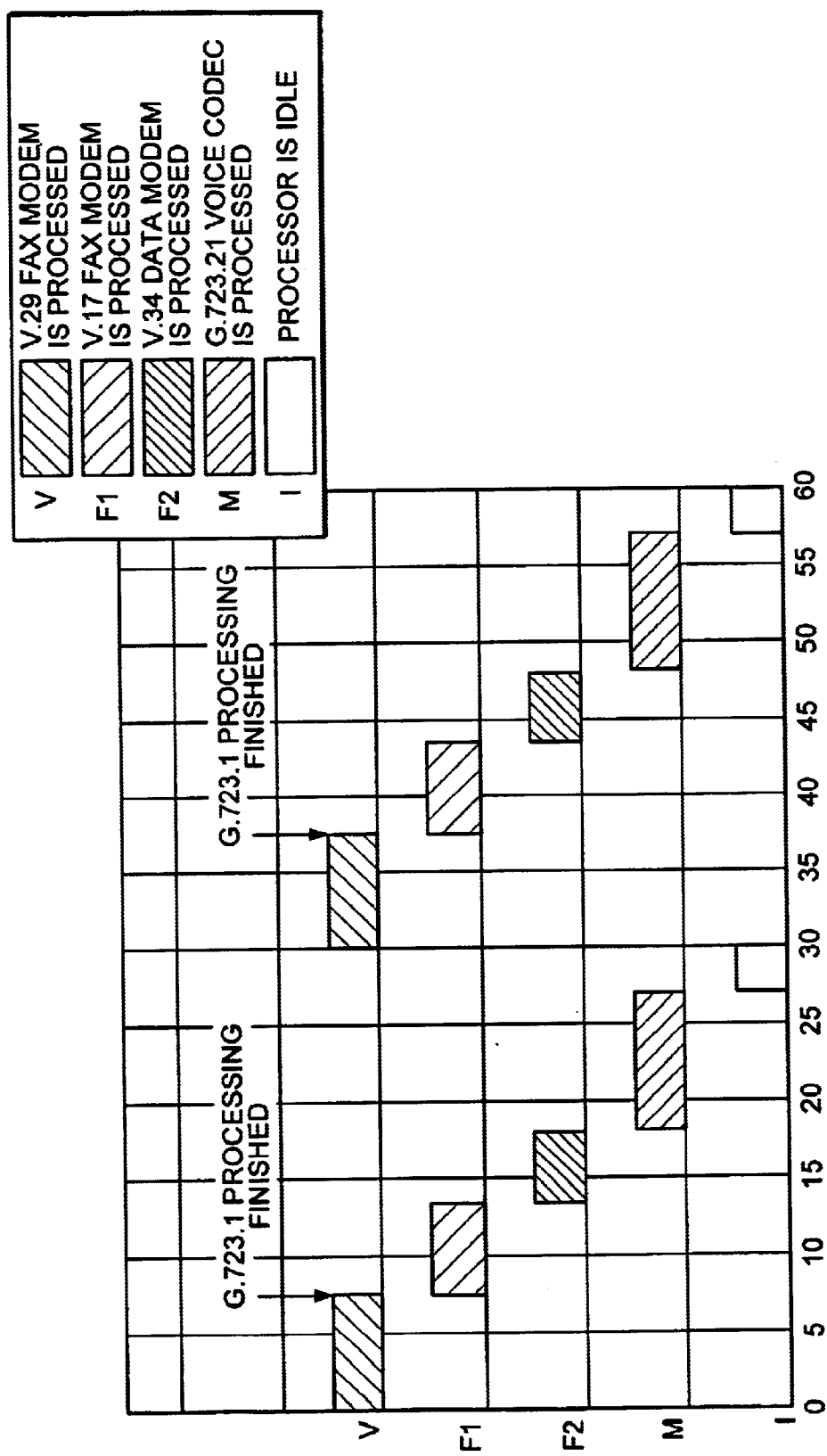
FIG. 5 graphically shows processing in a four channel gateway that processes a voice data type having an equal or larger specified frame size than the length of the transmission cycle.

FIG. 5 graphically shows processing, in accord with the processes of FIGS. 3 and 4, by a four channel sending gateway 16 that processes a voice data type having a specified frame size that is the same as the length of the transmission cycle. In particular, the following data types are processed in their specified channels:

V.29 fax modem protocol (identified as F1);
V.17 fax modem protocol (identified as F2);
V.34 data modem protocol (identified as M); and
G.723.1 voice codec (identified as V), which has a 30 millisecond frame size.

In the exemplary sending gateway 16, which is preconfigured to transmit the voice protocols of TABLE 1 above, the cycle is set to be 30 milliseconds (i.e., the same as the voice frame size) and the size of each non-time dependent frame is set to be 30 milliseconds. In accordance with illustrative processes, the 30 millisecond voice frame (V) is processed from n about 0–7.5 milliseconds. As noted above, this processing may include encoding, compressing, packetizing, and transmitting. From about 7.5 to 13 milliseconds, the V.29 fax modem frame (F1) frame is processed, while from about 13 to 17 milliseconds, the V.34 fax modem frame (F2) is processed. From about 17 to 27 milliseconds, the V.34 data modem frame (M) is processed, thus completing processing of the data on the four channels. Accordingly, the sending gateway 16 is idle from about 27 milliseconds to 30 milliseconds. This process repeats as necessary. It should be noted that although their frames are identically sized, the processing time required for processing each of the different frames can vary.

FIG. 6 graphically shows processing, in accord with the processes of FIGS. 3 and 4, by a four channel sending gateway 16 that processes voice data types having a smaller specified frame size than the length of the transmission cycle. In particular, the following data types are processed in their specified channels:

V.29 fax modem protocol (identified as F);
V.34 data modem protocol (identified as M);
G.723.1 voice codec (identified as V1), which has a 30 millisecond frame size; and
AAA voice protocol (identified as V2), which is any arbitrary voice codec having a 5 millisecond frame size.

In the exemplary sending gateway 16, which is preconfigured to transmit the voice protocols of TABLE 1 above, the cycle is set to be 30 milliseconds (i.e., the same as the largest voice frame size) and the size of each non-time dependent frame is set to be 30 milliseconds. Unlike the data types shown in FIG. 5, the AAA voice protocol has a frame size of 5 milliseconds. Accordingly, to reduce the potential delay of AAA voice frames, each frame of the AAA voice protocol must be processed every 5 milliseconds. If not, then AAA voice frames should arrive at the receiver 12 with some delay.

As shown in FIG. 6, the AAA frames (V2) are processed about every 5 milliseconds for approximately 1 millisecond. The AAA frames thus are processed from about 0 to 1 millisecond, about 5 to 6 milliseconds, about 10 to 11 milliseconds, about 15 to 16 milliseconds, about 20 to 21 milliseconds, and about 25 to 26 milliseconds. Each of the other frames of data for the other channels therefore must be processed when the AAA frames are not being processed. Accordingly, the G.723.1 frames therefore are broken up to be processed from between about 1 and 5 milliseconds, and between about 6 and 9 milliseconds. The V.29 fax modem frames (F) thus are processed between about 11 and 15 milliseconds, and the V.34 data modem frames are processed between about 16 and 20 milliseconds, and 21 and 24 milliseconds. The processor is idle between about 24 and 25 milliseconds, and about 26 and 30 milliseconds. The process repeats as necessary.

It should be noted that during the cycle shown in FIG. 6, some time dependent frames are transmitted after the non-time dependent frames (i.e., F and M are transmitted before some of the V2 frames). This should not affect performance, however, since the V2 frames are periodically transmitted at multiples of frame size (i.e., every 5 milliseconds) beginning before transmission of the fax and modem frames. One important factor that minimizes delay is transmission of time dependent frames at least once every time period equal to their frame size. Accordingly, each 5 millisecond voice frame of FIG. 6 is transmitted every five milliseconds, while each 30 millisecond voice frame of FIG. 6 is transmitted every thirty milliseconds.

Some embodiments of the invention may be implemented in any conventional computer programming language. For example, illustrative embodiments may be implemented in a procedural programming language (e.g., "C") or an object oriented programming language (e.g., "C++"). Alternative embodiments of the invention may be implemented as preprogrammed hardware elements (e.g., application specific integrated circuits and digital signal processors, as discussed), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention are disclosed below, it should be apparent to those skilled in the art that various changes and modifications can be made which will achieve some of the advantages of the invention without departing from the true scope of the invention. These and other obvious modifications are intended to be covered by the claims and appendix that follows:

I claim:

1. A method of forwarding data from a sending node to a receiving node across a network, the data including a set of time dependent data types and a set of non-time dependent data types, each of the set of time dependent data types specified to forward data in frames having a predefined frame size, the method comprising:

determining which data type of the set of time dependent data types has the largest predefined frame size;

encapsulating data of each of the set of non-time dependent data types in given frames having a size that is equal to the largest predefined frame size, each given frame having no more than one of the set of non-time dependent data types;

transmitting, during each of a plurality of cycles, at least one frame of data for each of the set of data types having time dependent data; and transmitting, during each of the plurality of cycles, one given frame for each of the set of data types having the non-time dependent data, each given frame being transmitted, during each of the plurality of cycles, after at least one frame for each of the set of time dependent data types is transmitted.

2. The method as defined by claim 1 wherein the set of time dependent data types ranges from one data type to a plurality of data types.

3. The method as defined by claim 1 wherein the set of non-time dependent data types ranges from one data type to a plurality of data types.

4. The method as defined by claim 1 wherein the set of time dependent data types includes at least one of an audio data type and a video data type.

5. The method as defined by claim 1 wherein the set of time dependent data types includes G.723.1 voice data types.

6. The method as defined by claim 1 wherein the set of non-time dependent data types includes fax data and modem data.

7. The method as defined by claim 6 wherein during each cycle, given frames having fax data are transmitted before given frames having modem data.

8. The method as defined by claim 1 wherein frames of time dependent data types are transmitted, during each cycle, in ascending order based upon the predefined size of frames of each such data type.

9. The method as defined by claim 1 wherein frames of time dependent data types are specified to tolerate a delay of greater than about 150 milliseconds.

10. An apparatus for forwarding data from a sending node to a receiving node across a network, the data including a set of time dependent data types and a set of non-time dependent data types, each of the set of time dependent data types specified to forward data in frames having a predetermined frame size, the apparatus comprising:

a processor that determines which data type of the set of time dependent data types has the largest predefined frame size;

a data encapsulator operatively coupled with the processor, the data encapsulator encapsulating data of each of the set of non-time dependent data types in given frames having a size that is equal to the largest predefined frame size, each given frame having no more than one of the set of non-time dependent data types;

an output module operatively coupled with the data encapsulator, the output module transmitting, during each of a plurality of cycles, at least one frame of data for each of the set of data types having time dependent data, the output module transmitting, during each of the plurality of cycles, one given frame for each of the set of data types having the non-time dependent data, each given frame being transmitted, during each of the plurality of cycles, after at least one frame for each of the set of time dependent data types is transmitted.

11. The apparatus as defined by claim 10 wherein the set of time dependent data types ranges from one data type to a plurality of data types.

12. The apparatus as defined by claim 10 wherein the set of non-time dependent data types ranges from one data type to a plurality of data types.

13. The apparatus as defined by claim 10 wherein the set of time dependent data types includes at least one of an audio data type and a video data type.

14. The apparatus as defined by claim 10 wherein the set of time dependent data types includes G.723.1 voice data types.

15. The apparatus as defined by claim 10 wherein the set of non-time dependent data types includes fax data and modem data.

16. The apparatus as defined by claim 15 wherein during each cycle, given frames having fax data are transmitted before given frames having modem data.

17. The apparatus as defined by claim 10 wherein the output module transmits frames of time dependent data types, during each cycle, in ascending order based upon the predefined size of frames of each such data type.

18. The apparatus as defined by claim 10 wherein non-time dependent data types are specified to tolerate a delay of greater than about 150 milliseconds.

19. A computer program product for use on a computer system for forwarding data from a sending node to a receiving node across a network, the data including a set of time dependent data types and a set of non-time dependent data types, each of the set of time dependent data types specified to forward data in frames having a predefined frame size, the computer program product comprising a computer usable medium having computer readable program code thereon, the computer readable program code comprising:

program code for determining which data type of the set of time dependent data types has the largest predefined frame size;

program code for encapsulating data of each of the set of non-time dependent data types in given frames having a size that is equal to the largest predefined frame size, each given frame having no more than one of the set of non-time dependent data types;

program code for transmitting, during each of a plurality of cycles, at least one frame of data for each of the set of data types having time dependent data; and program code for transmitting, during each of the plurality of cycles, one given frame for each of the set of data types having the non-time dependent data, each given frame being transmitted, during each of the plurality of cycles, after at least one frame for each of the set of time dependent data types is transmitted.

20. The computer program product as defined by claim 19 wherein the set of time dependent data types ranges from one data type to a plurality of data types.

21. The computer program product as defined by claim 19 wherein the set of non-time dependent data types ranges from one data type to a plurality of data types.

22. The computer program product as defined by claim 19 wherein the set of time dependent data types includes at least one of an audio data type and a video data type.

23. The computer program product as defined by claim 19 wherein the set of time dependent data types includes G.723.2 voice data types.

24. The computer program product as defined by claim 19 wherein the set of non-time dependent data types includes fax data and modem data.

25. The computer program product as defined by claim 24 wherein during each cycle, the program code for transmitting one given frame includes program code for transmitting given frames having fax data before given frames having modem data.

26. The computer program product as defined by claim 19 further comprising program code for transmitting frames of time dependent data types, during each cycle, in ascending order based upon the predefined size of frames of each such data type.

27. The computer program product as defined by claim 19 wherein non-time dependent data types are specified to tolerate a delay of greater than about 150 milliseconds.

28. A method of transmitting data of a plurality of different data types from a sender to a receiver across a network, the method comprising:
   determining if the data includes at least one time dependent data type and at least one non-time dependent data type;
   if it is determined that the data includes at least one time dependent data type and at least one non-time dependent data type, then determining which of the at least one time dependent data types is specified to have the largest predefined frame size;
   encapsulating the data of the at least one non-time dependent data types in given frames having a size that is equal to the largest predefined size, each given frame having data of no more than one data type; and
   transmitting, during each of a plurality of cycles, at least one frame of each data type, at least one frame for each of the at least one time dependent data types being transmitted before any of the given frames are transmitted.

29. The method as defined by claim 28 wherein the at least one time dependent data type includes at least one of an audio data type and a video data type.

30. The method as defined by claim 28 wherein the at least one time dependent data type includes G.723.1 voice data types.

31. The method as defined by claim 28 wherein the at least one non-time dependent data type includes fax data and modem data.

32. The method as defined by claim 31 wherein during each cycle, given frames having fax data are transmitted before given frames having modem data.

33. The method as defined by claim 28 wherein frames of time dependent data types are transmitted, during each cycle, in ascending order based upon the predefined size of frames of each such data type.

34. A apparatus for transmitting data of a plurality of different data types from a sender to a receiver across a network, the apparatus comprising:
   a processor for determining if the data includes at least one time dependent data type and at least one non-time dependent data type,
   if it is determined that the data includes at least one time dependent data type and at least one non-time dependent data type, then the processor determines which of the at least one time dependent data types is specified to have the largest predefined frame size;
   a data encapsulator operatively coupled with the processor, the data encapsulator encapsulating the data of the at least one non-time dependent data types in given frames having a size that is equal to the largest predefined size, each given frame having data of no more than one data type; and
   an output module operatively coupled with the data encapsulator, the output module transmitting, during each of a plurality of cycles, at least one frame of each data type, at least one frame for each of the at least one time dependent data types being transmitted before any of the given frames are transmitted.

35. The apparatus as defined by claim 34 wherein the at least one time dependent data type includes at least one of an audio data type and a video data type.

36. The apparatus as defined by claim 34 wherein the at least one time dependent data type includes G.723.1 voice data types.

37. The apparatus as defined by claim 34 wherein the at least one non-time dependant data type includes fax data and modem data.

38. The apparatus as defined by claim 37 wherein during each cycle, the output module transmits given frames having fax data before transmitting given frames having modem data.

39. The apparatus as defined by claim 34 wherein the output module transmits frames of time dependent data types, during each cycle, in ascending order based upon the predefined size of frames of each such data type.

40. A computer program product for use on a computer system for transmitting data of a plurality of different data types from a sender to a receiver across a network, the computer program product comprising a computer usable medium having computer readable program code thereon, the computer readable program code comprising:
   program code for determining if the data includes at least one time dependent data type and at least one non-time dependent data type;
   program code for determining which of the at least one time dependent data types is specified to have the largest predefined frame size if it is determined that the data includes at least one time dependent data type and at least one non-time dependent data type;
   program code for encapsulating the data of the at least one non-time dependent data types in given frames having a size that is equal to the largest predefined size, each given frame having data of no more than one data type; and
   program code for transmitting, during each of a plurality of cycles, at least one frame of each data type, at least one frame for each of the at least one time dependent data types being transmitted before any of given frames are transmitted.

41. The computer program product as defined by claim 40 wherein the at least one time dependent data type includes at least one of an audio data type and a video data type.

42. The computer program product as defined by claim 40 wherein the at least one time dependent data type includes G.723.1 voice data types.

43. The computer program product as defined by claim 40 wherein the at least one non-time dependent data type includes fax data and modem data.

44. The computer program product as defined by claim 43 further comprising program code for transmitting, during each cycle, given frames having fax data before transmitting given frames having modem data.

45. The computer program product as defined by claim 40 further comprising transmitting frames of time dependent data types, during each cycle, in ascending order based upon the predefined size of frames of each such data type.

46. A method of forwarding data from a sending node to a receiving node across a network, the data including a set of time dependent data types and a set of non-time dependent data types, each of the set of time dependent data types specified to forward data in frames having a predefined frame size, the method comprising:

determining which data type of the set of time dependent data types has the largest predefined frame size;

encapsulating data of each of the set of non-time dependent data types in given frames having a size that is equal to the largest predefined frame size, each given frame having no more than one of the set of non-time dependent data types;

transmitting across the network, during each of a plurality of cycles, at least one frame of data for each of the set of data types having time dependent data;

transmitting, during each of the plurality of cycles, one given frame for each of the set of data types having the non-time dependent data, each given frame being transmitted, during each of the plurality of cycles, after at least one frame for each of the set of time dependent data types is transmitted;

receiving the frames during each cycle; and reconstructing the data from the received frames.

47. The method as defined by claim 46 wherein the frames are received in a jitter buffer.

* * * * *